W. H. OLDFIELD.
NOISELESS FLUSHING TANK.
APPLICATION FILED SEPT. 21, 1916.
1,271,209.
Patented July 2, 1918.
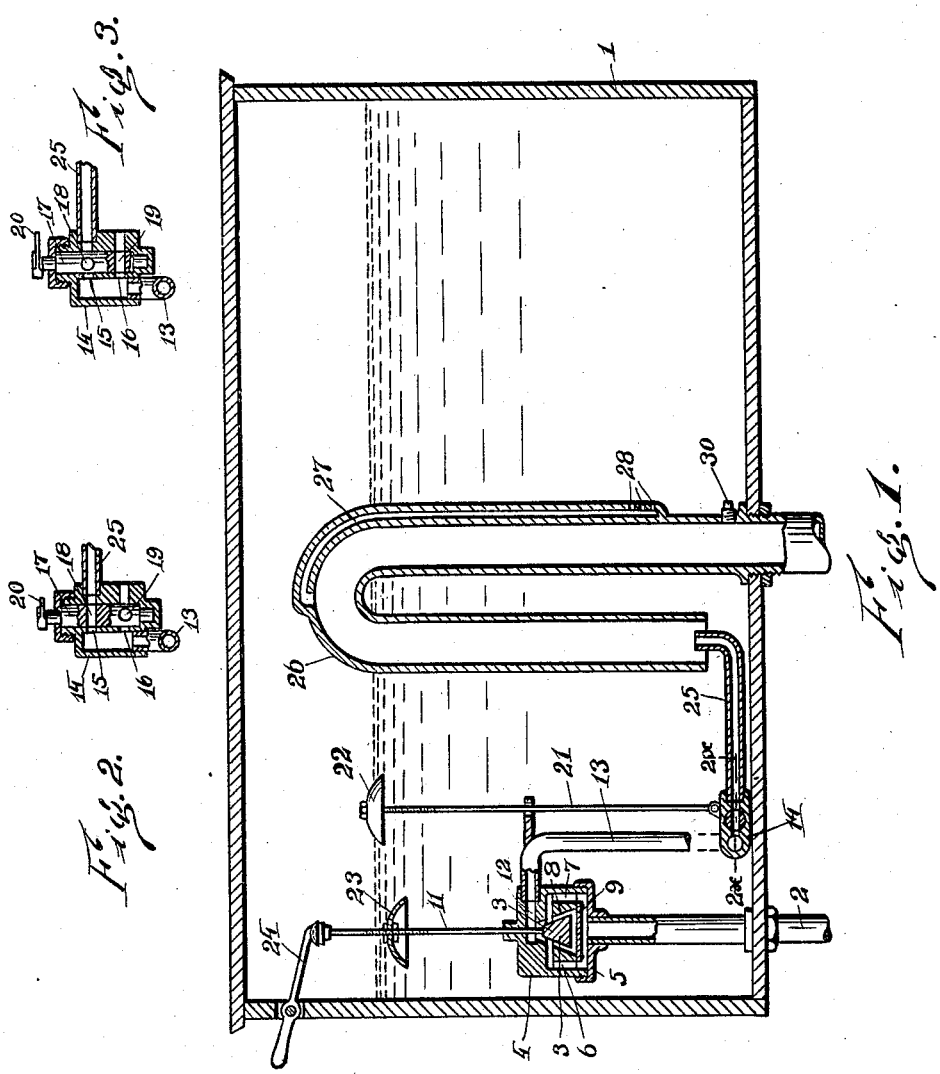

UNITED STATES PATENT OFFICE.

WILLIAM H. OLDFIELD, OF ROCHESTER, NEW YORK.

NOISELESS FLUSHING-TANK.

1,271,209.

Specification of Letters Patent.

Patented July 2, 1918.

Application filed September 21, 1916. Serial No. 121,501.

*To all whom it may concern:*

Be it known that I, WILLIAM H. OLDFIELD, a citizen of the United States, residing at Rochester, in the county of Monroe and State of New York, have invented certain new and useful Improvements in Noiseless Flushing-Tanks, of which the following is a specification.

The object of this invention is to provide a tank for flushing toilets noiselessly.

This and other objects of the invention will be fully illustrated in the drawings, described in the specification and pointed out in the claims at the end thereof.

In the drawings,

Figure 1 is a vertical longitudinal section through the tank.

Fig. 2 is a section on the line $2^x$—$2^x$ of Fig. 1 showing the valve in position to start the siphon.

Fig. 3 is a section on the same line with the valve shown in a different position.

In the accompanying drawings like reference numerals indicate like parts.

In the drawings reference numeral 1 indicates the tank and 2 indicates the water supply pipe for the tank. 3 indicates a valve placed at the top of the water supply pipe for the purpose of controlling the flow of water into the tank. This valve comprises a valve casing 4 and a cap screwed on the bottom thereof into which the pipe 2 is threaded. In the valve casing are the ducts or passages 6 and 7. In the valve casing is provided a valve seat 8 which is conical in shape and is open at both the top and the bottom. On the bottom this opening for the seat is closed by the plate 9 which plate prevents the water from going straight up through the valve casing but compels it to go around through the passages 6 and 7. Mounted to operate in the valve casing is the valve 3 which has fastened thereto at its upper end the valve stem 11 which passes through an opening in the upper part of the valve casing.

When the valve 3 rises it closes the openings 6 and 7 and prevents the flow of water past the valve. When the valve 3 is depressed it permits water to flow through the openings 6 and 7 past the valve into the passage 12 and through the duct 13. This duct leads to the bottom of the tank and is connected to the valve casing 14 located in the bottom of the tank. Through this valve casing are two sets of openings 15 and 16, which openings are controlled by the valve 17, which valve has two openings 18 and 19 therein at right angles to each other. These openings are placed in line with the openings 15 and 16 but being at right angles to each other only one of them can be used at a time for the purpose of passing the water.

When the tank is full the valve 17 stands in the position shown in Fig. 2 and is drawn to this position as follows:

On the end of the valve 17 is a crank 20 to which is connected a link 21, on the top of which is fastened a float 22. On the link or valve rod 11 is fastened the float 23 and pivotally connected to the top of the valve rod 11 is the lever 24 which is pivotally mounted in the side of the tank above the water line and extends through the tank.

When the outer end of the lever 24 is raised the float 23 will be depressed and the valve 3 will be depressed as well, permitting water to flow through the pipe 2 and the duct 13. When the water starts to flow it finds the valve 17 in the position shown in Fig. 2 and the water will flow through the opening 18 into the duct 25 from the end of which it will emerge as a jet into the siphon tube 26. This jet will have considerable force and will carry the water up with it over the goose neck at the top of the siphon and as the water runs down on the opposite side of the siphon it will start the flow of water through the siphon and draw the water of the tank after it. The siphon will draw the water out of the tank much faster than it runs in through the pipe 2 and the level of the water in the tank will soon begin to drop. As it drops, the float 22 will drop with it and the gravity thrust of this float will be communicated to the crank 20 and will cause the valve 17 to be turned from the position shown in Fig. 2 to the position shown in Fig. 3 and in this position the water will be discharged directly across the bottom of the tank through the openings 16 and 19 and will not be discharged up into the siphon through the tube 25.

To break the siphon and stop the flow of water from the tank, I provide the tube or passageway 27 which connects to the top of the siphon and extends downwardly in the tank and has the opening 28 in the bottom of the tube. As the water level in the tank drops it finally reaches the openings 28 and air can then pass through these openings and up through the tube 27 into the top of the siphon. As soon as air flows up to the top of the siphon, the siphon will thereafter draw air and will stop drawing the water. In this way the siphon will be broken without the noise that would otherwise be made by sucking both air and water through the bottom of the siphon.

After the siphon is broken the water will continue to flow into the tank and the water level in the tank will begin to rise. When the level gets high enough it will raise the float 23 and shut off the flow of water at the valve 3 and it will also raise the float 22 and place the valve 17 again in the position shown in Fig. 2.

It will be understood that the valve 3 will be gradually brought to its seat and it will therefore gradually shut off the flow of water and consequently the flow of water through the pipe 13 will be gradually diminished. The valve 17 will be turned to the position shown in Fig. 2 before the water is fully shut off, in which case the jet of water will again be turned into the siphon. If the water were flowing full force it would again start the siphon and drain the tank. But the flow of water into the siphon will be reduced by the valve 3 to that extent that the jet will not be able to cause the siphon to overflow. When the valve 3 is depressed after the tank is full the water will flow through the pipe 13 with a full head and with sufficient force to establish the siphon and drain the tank as above described.

It will be noticed that the chamber in which the valve 3 is located is shaped so as to act like a dash pot on the valve retarding the movement of it so that its movement either up or down will be slow and easy and not sudden.

It will also be noticed that the ducts 6 and 7 discharge water laterally against the upper part of the valve 3 and the effect of this discharge is to tend to force the valve down and to retard its upward movement when it is lifted by the float 23. The stems on which the floats 22 and 23 are carried are threaded so as to permit the adjustment of the floats up or down. The floats are adjusted so that the valve 17 takes the position shown in Fig. 2 shortly before the valve 3 closes on the filling of the tank.

A plug 30 is provided in the siphon near the bottom of the tank to permit the easy draining of the tank.

It will also be noticed that the opening 28 is located above the bottom of the siphon so that no air is drawn through the bottom of the siphon but the air is drawn entirely through the tube 27. The tube 27 is small and the water in it is quickly and noiselessly drawn out of it with the inrushing air and the air is thereafter drawn without interference to the top of the siphon. No air is drawn through the big siphon tube which, while the siphon is working, is full of water.

In siphon tubes through which air is drawn through the bottom of the tube, air and water will be drawn through the bottom of the tube together making a sucking noise, which noise is avoided in my tank because air is not permitted to enter the siphon except at the top.

It will also be noticed that the openings in the valve 17 will be large enough so that either one will begin to open before the other opening has fully closed.

I claim.

1. In a flushing tank the combination of a tank, a valve controlling the flow of water into said tank, a float for closing said valve, a second valve placed in series with the first named valve and having a plurality of ways therethrough to cause the water to flow to different parts of the tank.

2. In a flushing tank the combination of a tank, a valve controlling the flow of water into said tank, a float for closing said valve, a second valve placed in series with the first named valve and having a plurality of ways therethrough to cause the water to flow to different parts of the tank, a float on said second valve for turning it during the filling or emptying of the tank.

3. In a flushing tank the combination of a tank, a valve controlling the flow of water into said tank, a float for closing said valve, a second valve placed in series with said first named valve and having a plurality of ways therethrough, a siphon in said tank, said second valve operating to send a jet into said siphon when in one position and passing the water into the bottom of the tank when in the other position.

In testimony whereof I affix my signature.

WILLIAM H. OLDFIELD.